United States Patent
Pyun et al.

(10) Patent No.: US 9,648,614 B2
(45) Date of Patent: May 9, 2017

(54) IN-BUILDING WIRED/WIRELESS CONVERGENCE APPARATUS AND RESOURCE ALLOCATION METHOD THEREOF

(71) Applicant: KT CORPORATION, Gyeonggi-do (KR)

(72) Inventors: Sung-Yeop Pyun, Seoul (KR); Hyung-Jung Kim, Seoul (KR); Do-Young Kwak, Seoul (KR); Jong-Sik Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 170 days.

(21) Appl. No.: 14/443,713

(22) PCT Filed: Jul. 26, 2013

(86) PCT No.: PCT/KR2013/006715
§ 371 (c)(1),
(2) Date: May 19, 2015

(87) PCT Pub. No.: WO2014/092279
PCT Pub. Date: Jun. 19, 2014

(65) Prior Publication Data
US 2015/0327264 A1 Nov. 12, 2015

(30) Foreign Application Priority Data

Dec. 11, 2012 (KR) .................. 10-2012-0143779

(51) Int. Cl.
*H04W 72/04* (2009.01)
*H04L 12/803* (2013.01)
(Continued)

(52) U.S. Cl.
CPC ..... *H04W 72/0446* (2013.01); *H04L 43/0876* (2013.01); *H04L 47/125* (2013.01);
(Continued)

(58) Field of Classification Search
None
See application file for complete search history.

(56) References Cited

U.S. PATENT DOCUMENTS 8,032,148 B2 * 10/2011 Hettstedt ............... H04W 16/06
455/453
2008/0119198 A1 * 5/2008 Hettstedt ............... H04W 16/06
455/453
(Continued)

FOREIGN PATENT DOCUMENTS

KR 10-0825763 B1 4/2008
KR 10-2008-0052167 A 6/2008
(Continued)

*Primary Examiner* — Hassan Kizou
*Assistant Examiner* — Hashim Bhatti
(74) *Attorney, Agent, or Firm* — IP Legal Services, LLC

(57) ABSTRACT

A wired/wireless convergence apparatus may be provided for integrally transmitting wired network traffic and wireless network traffic in an in-building cloud network composed of a plurality of digital units and a plurality of radio units includes. The wired/wireless convergence apparatus may include a traffic monitoring unit and a wired/wireless traffic control unit. The traffic monitoring unit may be configured to monitor wireless network traffic and wired network traffic input to the in-building cloud network. The wired/wireless traffic control unit may be configured to allocate wireless network traffic resources to optical fibers on the basis of monitored information of the traffic monitoring unit and to allocate wired network traffic to idle resources remaining after allocation of the wireless network traffic.

16 Claims, 14 Drawing Sheets

(51) Int. Cl.
*H04L 29/08* (2006.01)
*H04W 28/16* (2009.01)
*H04L 12/26* (2006.01)
*H04W 24/02* (2009.01)

(52) U.S. Cl.
CPC .............. *H04L 67/10* (2013.01); *H04W 28/16* (2013.01); *H04W 24/02* (2013.01)

(56) References Cited

U.S. PATENT DOCUMENTS

| | | | |
|---|---|---|---|
| 2009/0191891 A1* | 7/2009 | Ma | G01S 1/68 455/456.1 |
| 2010/0002626 A1* | 1/2010 | Schmidt | H04W 88/085 370/328 |
| 2010/0029282 A1 | 2/2010 | Stamoulis et al. | |
| 2010/0177759 A1* | 7/2010 | Fischer | H04W 88/085 370/345 |
| 2010/0185537 A1* | 7/2010 | Bari | G06Q 30/04 705/34 |
| 2010/0189084 A1* | 7/2010 | Chen | H04W 84/045 370/338 |
| 2010/0296816 A1* | 11/2010 | Larsen | H04B 10/25754 398/116 |
| 2011/0305451 A1* | 12/2011 | Nishitani | H04L 12/5695 398/25 |
| 2012/0039320 A1* | 2/2012 | Lemson | H03F 1/3247 370/338 |
| 2012/0257516 A1* | 10/2012 | Pazhyannur | H04B 7/024 370/252 |
| 2012/0269059 A1* | 10/2012 | Gupta | H04W 8/082 370/229 |
| 2013/0064198 A1* | 3/2013 | Krishnaswamy | H04W 76/025 370/329 |
| 2013/0128810 A1* | 5/2013 | Lee | H04W 84/042 370/328 |

FOREIGN PATENT DOCUMENTS

| | | |
|---|---|---|
| KR | 10-2008-0052844 A | 6/2008 |
| KR | 10-2009-0010564 A | 1/2009 |
| KR | 10-0879451 B1 | 2/2009 |
| KR | 10-2010-0111547 A | 10/2010 |
| KR | 10-2010-0117544 A | 11/2010 |
| KR | 10-2011-0042096 A | 4/2011 |
| KR | 10-2011-0129921 A | 12/2011 |
| KR | 10-2012-0122213 A | 11/2012 |

* cited by examiner

IN-BUILDING WIRED/WIRELESS CONVERGENCE APPARATUS AND RESOURCE ALLOCATION METHOD THEREOF

CROSS REFERENCE TO RELATED APPLICATIONS

This application is a National Stage Patent Application of PCT International Patent Application No. PCT/KR2013/006715 (filed on Jul. 26, 2013) under 35 U.S.C. §371, which claims priority to Korean Patent Application No. 10-2012-0143779 (filed on Dec. 11, 2012), the teachings of which are incorporated herein in their entireties by reference.

TECHNICAL FIELD

The present disclosure relates to an in-building wired/wireless convergence apparatus and a resource allocation method thereof.

BACKGROUND ART

In an in-building environment, a network is composed of relays or femto cells, using radio frequency cables. Lately, neutral hosting is attracting attention as technology for in-building networks. In such neutral hosting, a common network is built as an in-building network and provided to a plurality of communication operators for providing communication services through the common network. The communication operators may be referred to as a communication operator.

In a neutral hosting in-building cloud network, a remote hub unit (RHU) and a broadband radio unit (RU) are deployed in one building. Neutral hosting provides communication services to in-building users by transmitting/receiving signals of multiple operators (e.g., multiple operators) or multiple digital units (DUs). The RHU converts an optical signal into a digital signal per each operator's frequency band. The broadband RU can provide services by integrating wireless network signals of a plurality of mobile communication operators. An RU and an RHU or RUs are connected through an optical fiber and commonly used by mobile communication operators.

Communication operators lease and commonly use RHUs, RUs, and optical fibers constructed in an in-building cloud network. However, in-building cloud networks have only provided wireless services. Accordingly, communication operators need to establish additional wired networks in order to provide wired-based services, for example, local area network (LAN), Wi-Fi, femto, Internet protocol television (IPTV), and the like to in-building users. Therefore, communication operators are required to invest a large amount of money and effort to provide fixed mobile convergence service to in-building users.

The above information disclosed in this Background section is only for enhancement of understanding of the background of the invention and therefore it may contain information that does not form the prior art that is already known in this country to a person of ordinary skill in the art.

DISCLOSURE

Technical Problem

Embodiments of the present disclosure have been made in an effort to provide an in-building wired/wireless convergence apparatus and a resource allocation method thereof having advantages of monitoring wired network traffic and wireless network traffic and adaptively allocating resources to the wired network traffic and wireless network traffic on the basis of traffic variation.

Technical Solution

An exemplary embodiment of the present disclosure provides a wired/wireless convergence apparatus for integrally transmitting wired network traffic and wireless network traffic in an in-building cloud network composed of a plurality of digital units and a plurality of radio units. The wired/wireless convergence apparatus may include: a traffic monitoring unit configured to monitor wireless network traffic and wired network traffic input to the in-building cloud network; and a wired/wireless traffic control unit configured to allocate wireless network traffic resources to optical fibers on the basis of monitored information of the traffic monitoring unit and to allocate wired network traffic to idle resources remaining after allocation of the wireless network traffic.

The traffic monitoring unit may monitor wireless network traffic received from digital units and wired network traffic received from an external wired network.

The traffic monitoring unit may monitor wireless network traffic received from wireless terminals and wired network traffic received from wired terminals.

The wired/wireless traffic control unit may allocate wireless network traffic resources and wired network traffic to each frame, wherein frames are allocated to a time domain resources while sharing a bandwidth of an optical fiber.

The wired/wireless traffic control unit may allocate wireless network traffic resources on the basis of a variation in wireless network traffic monitored by the traffic monitoring unit.

The wired/wireless traffic control unit may allocate wireless network traffic resources on the basis of the monitored information and configuration information of the in-building cloud network.

The wired/wireless traffic control unit may allocate predetermined resources for wireless network traffic of each communication operator on the basis of the configuration information including the number of communication operators accommodated by the in-building cloud network.

The wired/wireless traffic control unit may allocate wireless network traffic resources on the basis of the configuration information including a radio unit mode, wherein the radio unit mode includes at least one of a sector mode and a relay mode.

The wired/wireless traffic control unit may allocate wireless network traffic resources on the basis of the configuration information including information representing whether or not compression transmission is used.

The wired/wireless traffic control unit may allocate resources for a corresponding wired service to the idle resources on the basis of priority of wired services.

Another exemplary embodiment of the present disclosure provides a method for allocating resources of optical fibers by a wired/wireless convergence apparatus in an in-building cloud network composed of a plurality of digital units and a plurality of radio units. The method may include: monitoring wireless network traffic and wired network traffic input to the in-building cloud network; allocating wireless network traffic resources to optical fibers on the basis of monitored information; and allocating wired network traffic to idle resources remaining after allocation of wireless network traffic.

The monitoring of wireless network traffic and wired network traffic may include monitoring wireless network traffic received from a digital unit and wired network traffic received from an external wired network or monitoring wireless network traffic received from wireless terminals and wired network traffic received from wired terminals, according to the location of the wired/wireless convergence apparatus.

The allocating of wireless network traffic resources may include determining whether the wireless network traffic varies on the basis of the monitored information and allocating the wireless network traffic resources.

The allocating of wireless network traffic resources may include allocating wireless network traffic resources on the basis of the monitored information and configuration information of the in-building cloud network, the configuration information affecting the quantity of wireless network traffic.

The configuration information may include at least one of the number of communication operators accommodated by the in-building cloud network, a radio unit mode, and information representing whether or not compression transmission is used.

The allocating of wired network traffic may include allocating resources for the corresponding wired service to the white space on the basis of priority of wired services.

Advantageous Effects

According to an exemplary embodiment of the present disclosure, it is possible to simultaneously provide wired and wireless services using a remote hub unit and a radio unit without constructing an additional wired network. According to an exemplary embodiment of the present disclosure, in-building network resources can be adaptively allocated according to wired and wireless network traffic requirements. Therefore, according to exemplary embodiments of the present disclosure, it is possible to improve feasibility of in-building cloud network business by additionally providing wired services while maintaining wireless service quality.

MODE FOR INVENTION

Figure 1:
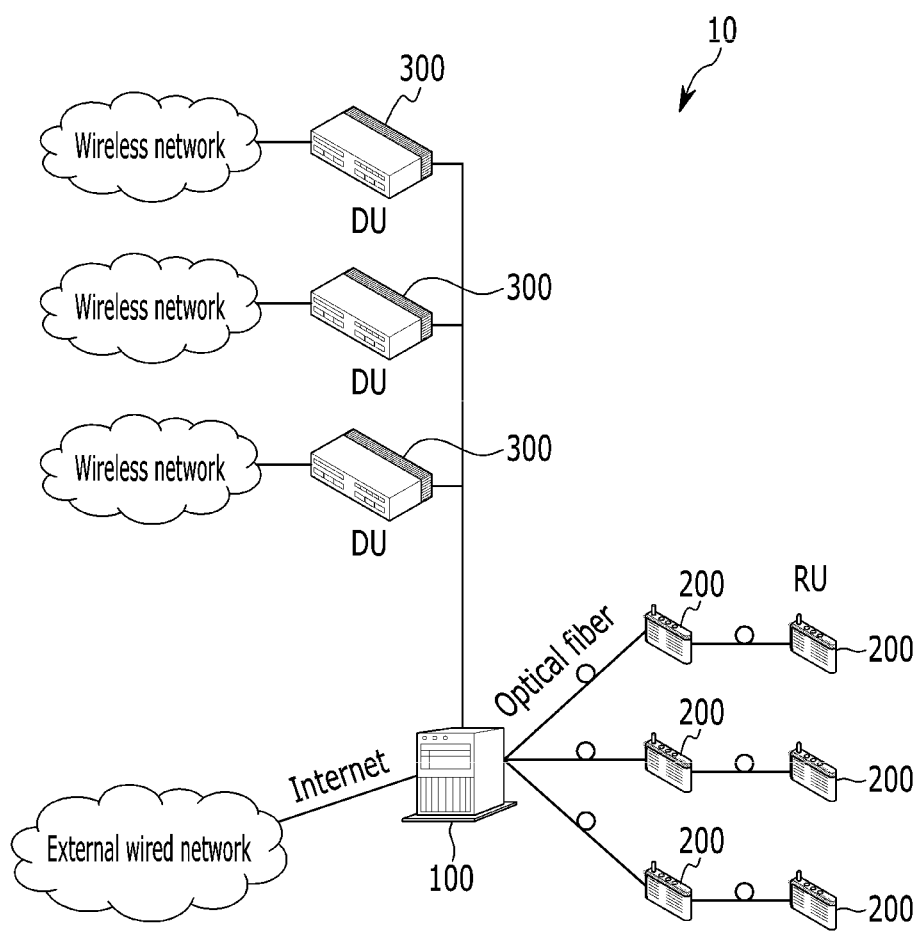
FIG. 1 illustrates an in-building cloud network according to an exemplary embodiment.

In the following detailed description, only certain exemplary embodiments of the present disclosure have been shown and described, simply by way of illustration. As those skilled in the art would realize, the described embodiments may be modified in various different ways, all without departing from the spirit or scope of embodiments of the present disclosure. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

A description will be given of an in-building wired/wireless convergence apparatus and a resource allocation method thereof.

FIG. 1 illustrates an in-building cloud network according to an exemplary embodiment.

Referring to FIG. 1, an in-building cloud network 10 is a communication network connecting communication devices installed in a building. A plurality of communication operators commonly uses at least one of communication devices.

The in-building cloud network 10 may include: a radio signal processing device that amplifies radio signals and transmits the amplified radio signals through an antenna; and a digital signal processing device that processes signals received from the radio signal processing device. The radio signal processing device may include a remote radio head (RRH) and a radio unit (RU). The digital signal processing device may include a digital unit (DU). An RU and an RRH or RUs are connected through an optical fiber.

The in-building cloud network 10 includes an RRH 100, a plurality of RUs 200, and a plurality of DUs 300. The RRH 100 may be located between the RUs 200 and the DUs 300. The DUs are connected to wireless networks corresponding thereto. Here, it is assumed that each DU processes signals of a designated communication operator and RUs process radio signals of a plurality of communication operators in an integrated manner.

The RRH 100 is connected to the plurality of DUs 300 and an external wired network.

The RRH 100 distributes and shares signals transmitted between the DUs 300 and the RUs 200 according to in-building traffic state. The RRH 100 receives signals from the DUs 300 and transmits the received signals to the RUs 200 through a single broadband. The RRH 100 receives signals transmitted from the RUs 200, filters the received signals for respective communication operators, and then transmits the filtered signals to DUs of corresponding operators. Here, signals transmitted between the DUs 300 and the RUs 200 are signals transmitted by mobile terminals in the corresponding building or signals transmitted to mobile terminals in the building. Hereinafter, such signals are referred to as wireless network signals or wireless network traffic.

The RRH 100 receives signals related to wired-based services from the RUs 200 and transmits the received signals to the external wired network/Ethernet. The RRH 100 receives signals from the external wired network and transmits the received signals to the RUs 200. The wired-based services denote services provided through a wired network. For example, the wired-based services may include LAN, Wi-Fi, femto, IPTV, Internet telephone, and the like. Here, signals transmitted between the external wired network and the RUs 200 are referred to as wired network signals or wired network traffic.

An optical fiber of the in-building cloud network 10 has broadband capacity. The resource capacity of the optical fiber varies according to wireless network traffic change. Particularly, the in-building cloud network 10 receives radio signals of a plurality of communication operators through optical fibers that are shared infrastructure. Accordingly, there is a large traffic variation in optical fibers. Even during switching between sector/relay modes of an RU, optical fibers have a large traffic variation. This is because traffic is reduced when the RU is switched from the sector mode to the relay mode. In addition, optical fiber traffic is reduced when the RRH 100 and the RU group 200 use compression transmission.

Since wireless network traffic is varied in the in-building cloud network 10, as described above, the wired/wireless convergence apparatus also provides wired-based services using the usable resources remained by the wireless network traffic variation.

Figure 2:
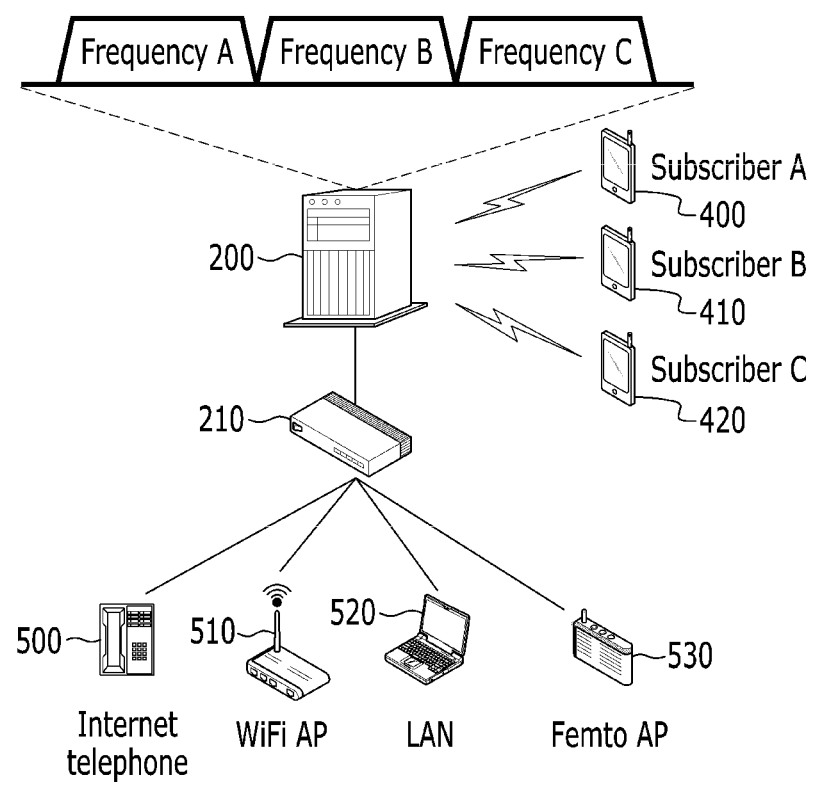
FIG. 2 illustrates wired/wireless service access according to an exemplary embodiment.

FIG. 2 illustrates wired/wireless service access according to an exemplary embodiment.

Referring to FIG. 2, an RU 200 includes a radio access unit to which a wireless terminal is connected and a wired access unit to which a wired terminal is connected.

The radio access unit (not shown) processes a frequency of each communication operator. A terminal A 400 subscribes to a communication operator A using a frequency band A, a terminal B 410 subscribes to communication operator B using a frequency band B, and a terminal C 420 subscribes to communication operator C using a frequency band C. In this case, the terminal A 400, the terminal B410, and the terminal C420 can be connected to the RU 200.

The wired access unit may be separated from the RU 200, and an additional wired access unit 210 may be connected to the RU 200 through an Ethernet cable, as shown in FIG. 2. In this case, the RU 200 includes a terminal connected to the wired access unit 210, that is, an Ethernet port. The wired access unit device may be integrated with the RU 200.

The wired access unit 210 is connected with a wired terminal. For example, the wired access unit includes an Internet telephone 500, a Wi-Fi access device 510, a computer 520, a femto access device 530, and the like.

Accordingly, the RU 200 transmits and receives both a wireless network signal related to a wired terminal and a wired network signal related to a wired terminal.

Figure 3:
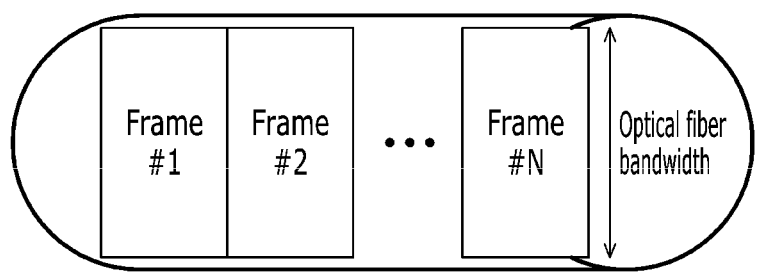
FIGS. 3 and 4 illustrate a frame structure of a wired/wireless convergence network according to an exemplary embodiment.
Figure 4:
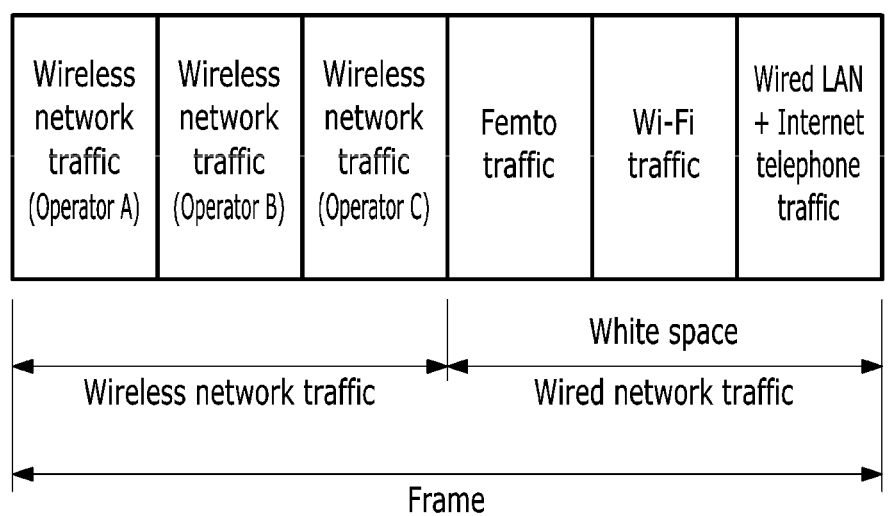

FIGS. 3 and 4 illustrate a frame structure of a wired/wireless convergence network according to an exemplary embodiment.

Referring to FIG. 3, a wired/wireless convergence apparatus 600 allocates optical fiber resources for wired network traffic and wireless network traffic while monitoring variation in wireless network traffic transmitted from the in-building cloud network 10.

The wired/wireless convergence apparatus 600 can allocate optical fiber resources on a frame basis. Frames are allocated to the time domain while sharing a bandwidth of an optical fiber.

Referring to FIG. 4, the wired/wireless convergence apparatus 600 allocates wireless network traffic and wired network traffic to one frame. The wired/wireless convergence apparatus 600 allocates resources per each communication operator or each wireless network. The wired/wireless convergence apparatus 600 assigns idle resources, which remain after wireless network traffic allocation, to wired network traffic. The wired/wireless convergence apparatus 600 may classify wired services by a service type and allocate resources for respective wired service types.

Figure 5:
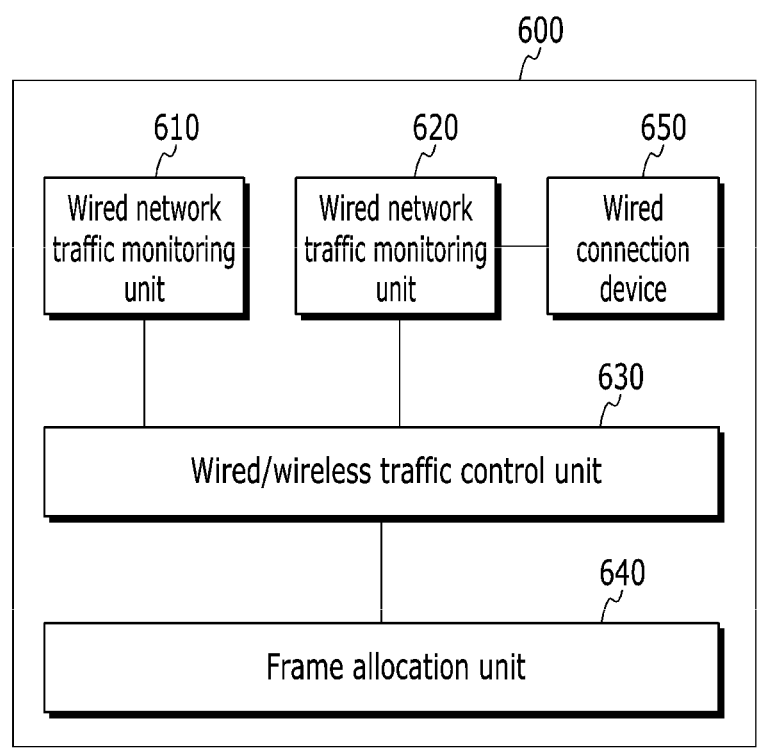
FIG. 5 is a block diagram of a wired/wireless convergence apparatus according to an exemplary embodiment.
Figure 6:
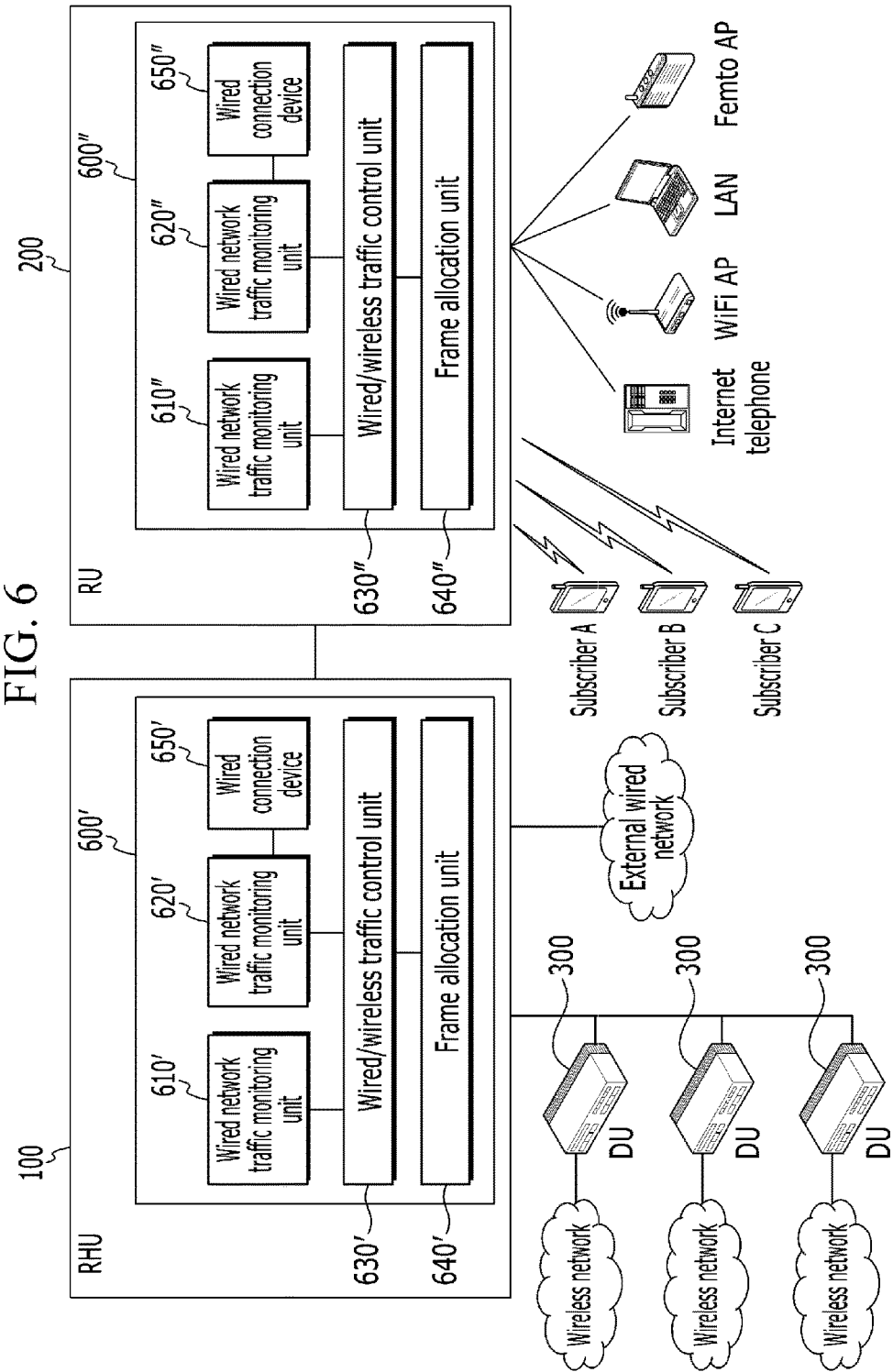
FIG. 6 illustrates an in-building cloud network including the wired/wireless convergence apparatus according to an exemplary embodiment.

FIG. 5 is a block diagram of a wired/wireless convergence apparatus according to an exemplary embodiment, and FIG. 6 illustrates an in-building cloud network including the wired/wireless convergence apparatus according to an exemplary embodiment.

Referring to FIG. 5, the wired/wireless convergence apparatus 600 includes a wireless network traffic monitoring unit 610, a wired network traffic monitoring unit 620, a wired/wireless traffic control unit 630, and a frame allocation unit 640. The wireless network traffic monitoring unit 610 and the wired network traffic monitoring unit 620 may be integrated into one unit. The wired/wireless convergence apparatus 600 may further include a wired connection device 650 for connection to an external wired network. The wired connection device 650 may be a device including an Ethernet port, for example, a network switch, a network hub, and the like.

The wired/wireless convergence apparatus 600 may be included in the in-building cloud network 10. As shown in FIG. 6, the wired/wireless convergence apparatus 600 may be positioned at a point where wireless network traffic and wired network traffic branch off. That is, the wired/wireless convergence apparatus 600 may be implemented in at least one of the RRH 100 and the RU 200. The wired/wireless convergence apparatus 600 implemented in the RRH 100 is referred to as a wired/wireless convergence apparatus 600', and the wired/wireless integrated device 600 implemented in the RU 200 is referred to as a wired/wireless convergence apparatus 600" in the following description.

The wireless network traffic monitoring unit 610 monitors wireless network traffic. The wireless network traffic monitoring unit 610 transmits monitored information to the wired/wireless traffic control unit 630.

A wireless network traffic monitoring unit 610' implemented in the RRH 100 monitors wireless network traffic sent from each DU 300. The wireless network traffic monitoring unit 610' may transmit configuration information of the in-building cloud network 10 along with monitored information to a wired/wireless traffic control unit 630'. For reference, the configuration information of the in-building cloud network 10 may be preset in the wired/wireless traffic control unit 630'. The configuration information of the in-building cloud network 10 includes information indicating whether compression transmission is used, a mode of the RU, and the like. The mode of the RU may include a sector mode and a relay mode.

A wireless network traffic monitoring unit 610" implemented in the RU 200 monitors wireless network traffic received from wireless terminals 400, 410, and 420 per each communication operator. The wireless network traffic monitoring unit 610" may transmit monitored information, such as QoS and the quantity of traffic, and the configuration information of the in-building cloud network 10, to a wired/wireless traffic control unit 630".

The wired network traffic monitoring unit 620 monitors wired network traffic. The wired network traffic monitoring unit 620 transmits monitored information to the wired/wireless traffic control unit 630.

The wired network traffic monitoring unit 620' implemented in the RRH 100 monitors wired network traffic received from the external wired network per each service type. The wired network traffic monitoring unit 620' may transmit monitored information to the wired/wireless traffic control unit 630'. The monitored information includes QoS, the quantity of traffic, and the like.

The wired network traffic monitoring unit 620" implemented in the RU 200 monitors wired network traffic received from a wired connection device 650" per each service type. The wired network traffic monitoring unit 620" transmits monitored information, such as QoS and the quantity of traffic, to the wired/wireless traffic control unit 630".

The wired/wireless traffic control unit 630 adaptively allocates wired/wireless network traffic resources on the basis of information received from the wireless network traffic monitoring unit 610 and the wired network traffic monitoring unit 620.

The frame allocation unit 640 allocates frames on the basis of resource information per traffic, allocated by the wired/wireless traffic control unit 630. The frames are allocated to a time domain while sharing a bandwidth of an optical fiber.

The wired connection device 650 is a device for connecting a wired network and a wired terminal. The wired connection device 650 may be included in the wired/wireless convergence apparatus 600 or implemented separately from the wired/wireless convergence apparatus 600. A method for adaptively allocating wired/wireless network traffic resources by the wired/wireless traffic control unit will be described, hereinafter.

Figure 7:
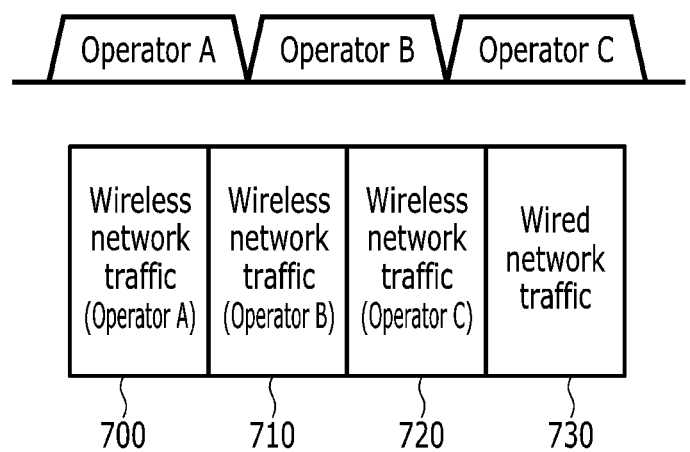
FIGS. 7, 8, and 9 illustrate a wired/wireless network traffic resource allocation method based on a plurality of wireless networks according to an exemplary embodiment.
Figure 8:
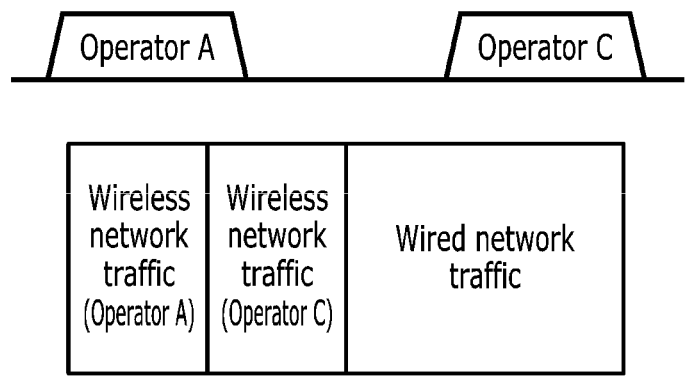
Figure 9:
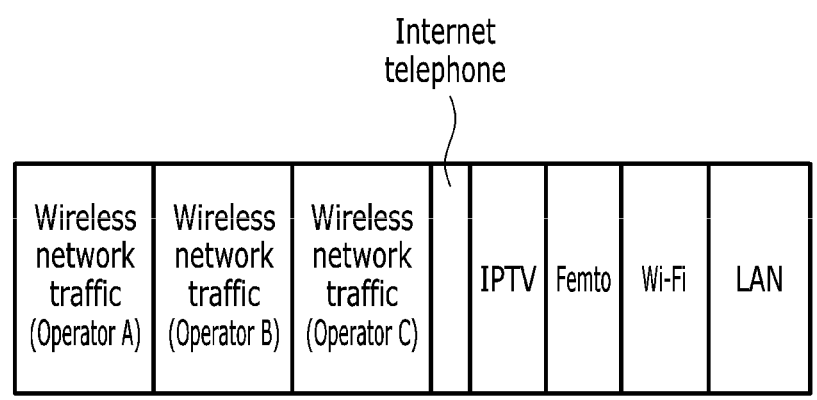

FIGS. 7, 8, and 9 illustrate wired/wireless network traffic resource allocation methods based on a plurality of wireless networks according to an exemplary embodiment.

Referring to FIG. 7, the wired/wireless traffic control unit 630 allocates wired network traffic first on the basis of monitored information received from the wireless network traffic monitoring unit 610. Here, the wired/wireless traffic control unit 630 can allocate resources per each wireless network. For example, when the in-building cloud network 10 provides services by integrating radio signals of a communication operator A using a frequency band A, a communication operator B using a frequency band B, and a communication operator C using a frequency band C, the wired/wireless traffic control unit 630 allocates resources 700 for the communication operator A, resources 710 for the communication operator B and resources 720 for communication operator C. Then, the wired/wireless traffic control unit 630 allocates wired network traffic to the idle resources 730 remaining after allocation of the wireless network traffic.

Accordingly, the in-building cloud network 10 can stably provide wireless services to in-building users and also provide wired services using resources remaining after allocation of the wireless network traffic.

Referring to FIG. 8, the in-building cloud network 10 may not accommodate a certain communication operator, for example, the communication operator B. Accordingly, the wired/wireless traffic control unit 630 allocates resources for the communication operator B to wired network traffic.

Referring to FIG. 9, the wired/wireless traffic control unit 630 allocates wired network traffic to resources remaining after allocation of wireless network traffic. Here, the wired/wireless traffic control unit 630 allocates the wired network traffic on the basis of monitored information received from the wired network traffic monitoring unit 620.

The wired/wireless traffic controller 630 may allocate predetermined resources per each wired service type. Here, the wired/wireless traffic control unit 630 can assign a priority to each wired service on the basis of QoS and the quantity of traffic of each wired service. For example, the wired/wireless traffic control unit 630 can preferentially allocate traffic of a service with high QoS, for example, Internet telephone or IPTV traffic.

Figure 10:
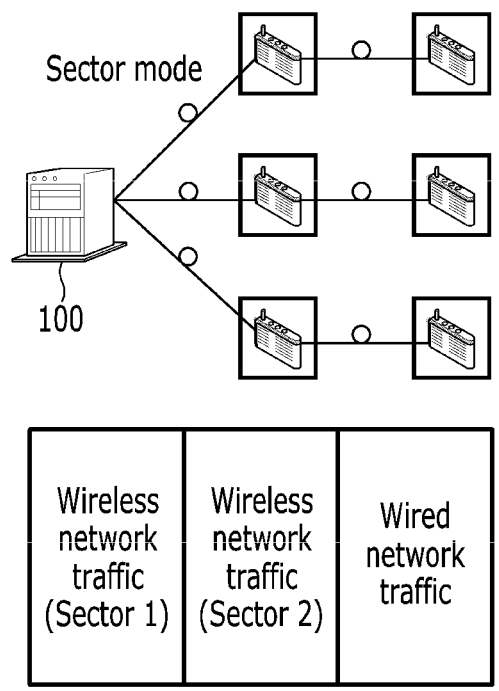
FIGS. 10 and 11 illustrate a wired/wireless network traffic resource allocation method based on a radio unit mode according to an exemplary embodiment.
Figure 11:
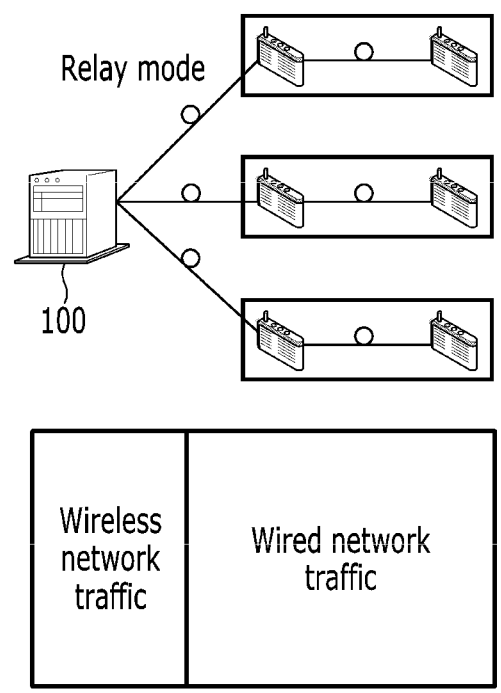

FIGS. 10 and 11 illustrate a wired/wireless network traffic resource allocation method based on an RU mode according to an exemplary embodiment.

Referring to FIGS. 10 and 11, the in-building cloud network 10 may switch the RU 200 to a sector mode to increase capacity or to a relay mode to secure coverage according to demand for in-building wireless network traffic.

The wired/wireless traffic control unit 630 allocates resources for wireless network traffic and resources for wired network traffic on the basis of the mode of the RU 200.

For example, when the RU 200 is set to the sector mode, as shown in FIG. 10, the wired/wireless traffic control unit 630 allocates resources for wired network traffic per a sector. The wired/wireless traffic control unit 630 allocates wired network traffic to the resources remaining after allocation of the wireless network traffic.

For example, when the RU 200 is set to the relay mode, as shown in FIG. 11, the wired/wireless traffic control unit 630 allocates resources for predetermined wireless network traffic. In addition, the wired/wireless traffic control unit 630 allocates wired network traffic to resources remaining after allocation of the wireless network traffic.

Since a size of idle resources varies according to the mode of the RU 200, as described above, the wired/wireless traffic control unit 630 can calculate the resources remaining after allocation of the wireless network traffic and provide wired network services.

Figure 12:
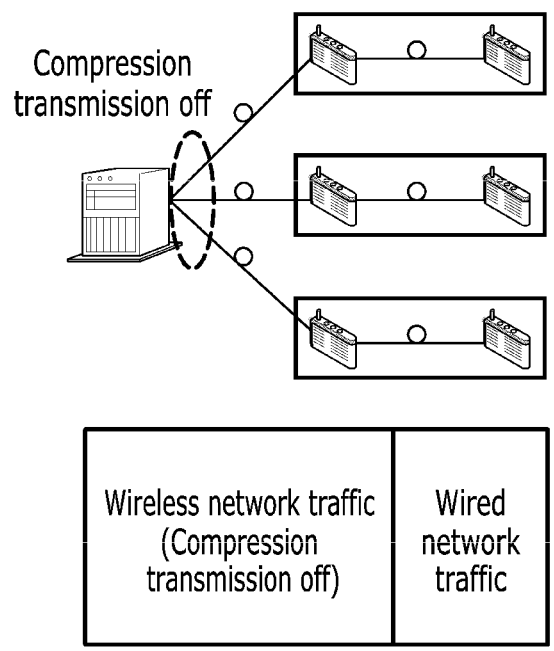
FIGS. 12 and 13 illustrate a wired/wireless network traffic resource allocation method based on compression transmission according to an exemplary embodiment.
Figure 13:
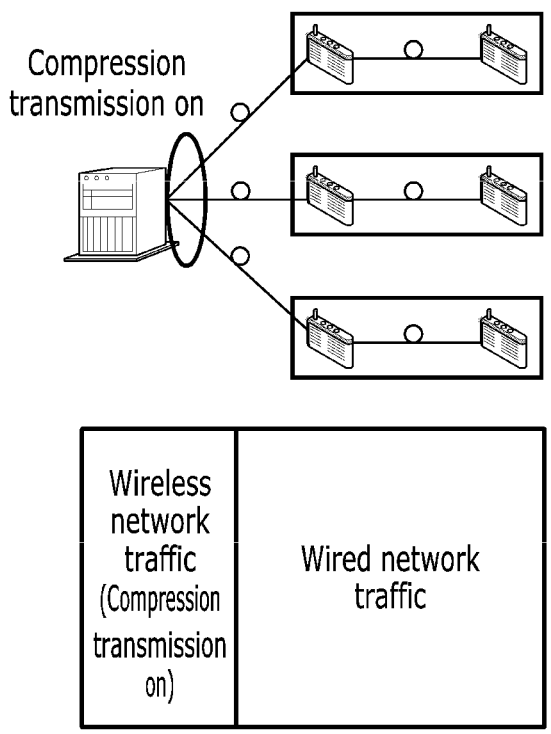

FIGS. 12 and 13 illustrate a method for allocating wired/wireless network traffic resources based on compression transmission according to an exemplary embodiment.

Referring to FIGS. 12 and 13, the in-building cloud network 10 may use compression transmission. In this case, wireless network traffic is reduced and thus idle resources in a frame increase. Accordingly, the wired/wireless traffic control unit 630 can adaptively vary resources allocated to wireless network traffic on the basis of whether or not compression transmission is used.

Figure 14:
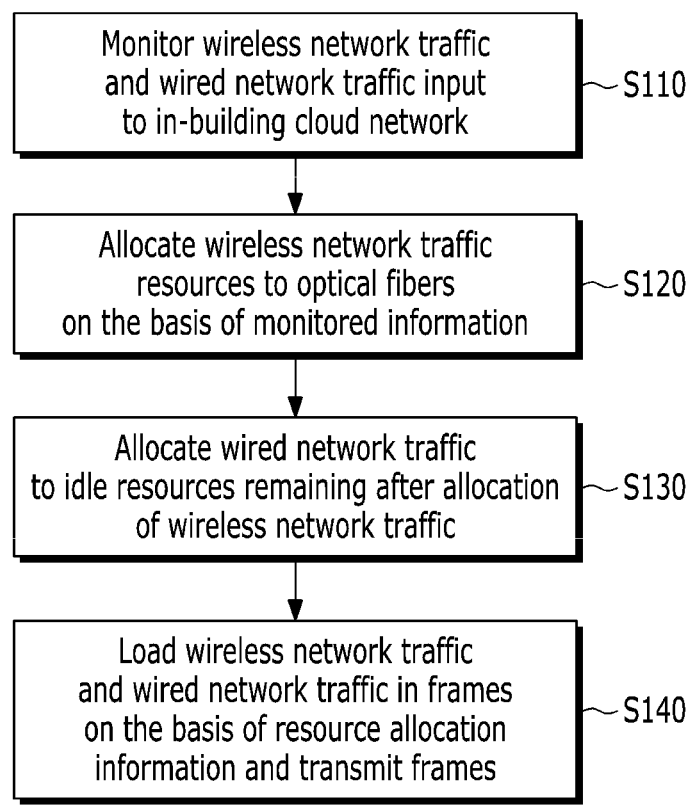
FIG. 14 is a flowchart illustrating a resource allocation method of the wired/wireless convergence apparatus according to an exemplary embodiment.

FIG. 14 is a flowchart illustrating a resource allocation method of a wired/wireless convergence apparatus according to an exemplary embodiment.

Referring to FIG. 14, a wired/wireless convergence apparatus 600 monitors wireless network traffic and wired network traffic input to an in-building cloud network (S110). The wired/wireless convergence apparatus 600 monitors QoS and the quantity of traffic of each of the wireless network traffic and wired network traffic.

The wired/wireless convergence apparatus 600 allocates wireless network traffic resources to optical fibers on the basis of the monitored information (S120). The wired/wireless convergence apparatus 600 may allocate the wireless network traffic using configuration information of an in-building cloud network along with the monitored information. Here, the configuration information of the in-building cloud network includes information representing whether or not compression transmission is used, a mode of the RU, and the like.

The wired/wireless convergence apparatus 600 allocates wired network traffic to idle resources remaining after allocation of the wireless network traffic (S130).

The wired/wireless convergence apparatus 600 loads the wireless network traffic and the wired network traffic in frames on the basis of resource allocation information and transmits the frames (S140).

As described above, according to an exemplary embodiment of the present disclosure, the in-building cloud network 10 can simultaneously provide wired and wireless services without establishing an additional wired network. According to an exemplary embodiment of the present disclosure, the wired/wireless convergence apparatus 600 can adaptively allocate in-building network resources according to requirements of wired/wireless network traffic. Therefore, according to an exemplary embodiment of the present disclosure, the in-building cloud network 10 can additionally provide wired services while maintaining wireless service quality, thereby improving feasibility.

The aforementioned exemplary embodiments of the present disclosure are not implemented only through a device and a method, and may be implemented through a program that executes functions corresponding to components of the exemplary embodiments of the present invention or a recording medium storing the program.

While these embodiments of the present disclosure have been described in connection with what is presently considered to be practical exemplary embodiments, it is to be understood that the embodiments are not limited to the disclosed embodiments, but, on the contrary, is intended to cover various modifications and equivalent arrangements included within the spirit and scope of the appended claims.

The invention claimed is:

1. A non-transitory machine-readable medium, having encoded thereon program code, wherein when the program code is executed by a machine, the machine implements a method of integrally transmitting wired network traffic and wireless network traffic in an in-building cloud network composed of a plurality of digital units and a plurality of radio units, the method comprising:
monitoring wireless network traffic and wired network traffic input to the in-building cloud network; and
allocating wireless network traffic to optical fiber resources based on the monitored information and allocating wired network traffic to idle optical fiber resources remaining after allocation of the wireless network traffic.

2. The non-transitory machine-readable medium of claim 1, wherein the monitoring comprises monitoring wireless network traffic received from digital units and wired network traffic received from an external wired network.

3. The non-transitory machine-readable medium of claim 1, wherein the monitoring comprises monitoring wireless network traffic received from wireless terminals and wired network traffic received from wired terminals.

4. The non-transitory machine-readable medium of claim 1, wherein the allocating comprises allocating wireless network traffic resources and wired network traffic to each frame, wherein frames are allocated to a time domain resources while sharing a bandwidth of an optical fiber.

5. The non-transitory machine-readable medium of claim 1, wherein the the allocating comprises allocating wireless network traffic resources based on a variation in wireless network traffic monitored by the traffic monitoring unit.

6. The non-transitory machine-readable medium of claim 1, wherein the allocating comprises allocating wireless network traffic resources based on the monitored information and configuration information of the in-building cloud network.

7. The non-transitory machine-readable medium of claim 6, wherein the allocating comprises allocating predetermined resources for wireless network traffic of each communication operator based on the configuration information including the number of communication operators accommodated by the in-building cloud network.

8. The non-transitory machine-readable medium of claim 6, wherein the allocating comprises allocating wireless network traffic resources based on the configuration information including a radio unit mode, wherein the radio unit mode includes at least one of a sector mode and a relay mode.

9. The non-transitory machine-readable medium of claim 6, wherein the allocating comprises allocating wireless network traffic resources based on the configuration information including information representing whether or not compression transmission is used.

10. The non-transitory machine-readable medium of claim 1, wherein the allocating comprises allocating resources for a corresponding wired service to the idle resources based on a priority of wired services.

11. A method for allocating resources of optical fibers by a wired/wireless convergence apparatus in an in-building cloud network composed of a plurality of digital units and a plurality of radio units, the method comprising:
monitoring wireless network traffic and wired network traffic input to the in-building cloud network;
allocating wireless network traffic to optical fiber resources based on the monitored information; and
allocating wired network traffic to idle optical fiber resources remaining after allocation of wireless network traffic.

12. The method of claim 11, wherein the monitoring of wireless network traffic and wired network traffic comprises performing one of monitoring wireless network traffic received from a digital unit and wired network traffic received from an external wired network and monitoring wireless network traffic received from wireless terminals and wired network traffic received from wired terminals, according to the location of the wired/wireless convergence apparatus.

13. The method of claim 11, wherein the allocating of wireless network traffic resources comprises determining whether the wireless network traffic varies based on the monitored information and allocating the wireless network traffic resources.

14. The method of claim 11, wherein the allocating of wireless network traffic resources comprises allocating wireless network traffic resources based on the monitored information and configuration information of the in-building cloud network, the configuration information affecting the quantity of wireless network traffic.

15. The method of claim 14, wherein the configuration information includes at least one of the number of communication operators accommodated by the in-building cloud network, a radio unit mode and information representing whether or not compression transmission is used.

16. The method of claim 11, wherein the allocating of wired network traffic comprises allocating resources for the corresponding wired service to the idle resources based on a priority of wired services.

* * * * *